(12) United States Patent
Sanchez

(10) Patent No.: US 12,226,049 B2
(45) Date of Patent: Feb. 18, 2025

(54) BARBECUE (BAR-B-QUE) GRILL AND SMOKER

(71) Applicant: Jorge F. Sanchez, Midlothian, TX (US)

(72) Inventor: Jorge F. Sanchez, Midlothian, TX (US)

( * ) Notice: Subject to any disclaimer, the term of this patent is extended or adjusted under 35 U.S.C. 154(b) by 801 days.

(21) Appl. No.: 16/935,183

(22) Filed: Jul. 21, 2020

(65) Prior Publication Data

US 2020/0345177 A1 Nov. 5, 2020

Related U.S. Application Data

(63) Continuation of application No. 15/953,403, filed on Apr. 14, 2018, now Pat. No. 10,750,905.

(51) Int. Cl.
*A47J 37/07* (2006.01)
*A23B 4/052* (2006.01)

(52) U.S. Cl.
CPC ......... *A47J 37/0704* (2013.01); *A23B 4/0523* (2013.01); *A47J 37/0786* (2013.01)

(58) Field of Classification Search
CPC .... A47J 37/0713; A47J 37/07; A47J 37/0786; A47J 37/0704; A23B 4/052; A23B 4/0523
See application file for complete search history.

(56) References Cited

U.S. PATENT DOCUMENTS

| | | | | | |
|---|---|---|---|---|---|
| 5,718,165 | A | * | 2/1998 | Winstead | A47J 37/0713 99/446 |
| 6,000,389 | A | * | 12/1999 | Alpert | A47J 37/0713 126/41 R |
| 6,595,197 | B1 | * | 7/2003 | Ganard | A47J 37/0704 99/476 |
| 7,703,389 | B2 | * | 4/2010 | McLemore | A47J 37/1209 99/410 |
| 2004/0112226 | A1 | * | 6/2004 | Johnston | A47J 37/0704 99/450 |
| 2006/0137543 | A1 | * | 6/2006 | Mclemore | A23B 4/052 99/482 |
| 2012/0125323 | A1 | * | 5/2012 | Goeken | A47J 37/0704 126/9 R |
| 2017/0238761 | A1 | * | 8/2017 | Jungmeyer | A47J 37/0754 |
| 2018/0168397 | A1 | * | 6/2018 | Colston | A47J 36/38 |
| 2020/0214304 | A1 | * | 7/2020 | Garces | A23B 4/052 |

* cited by examiner

*Primary Examiner* — Brian W Jennison
(74) *Attorney, Agent, or Firm* — Thrasher Associates, LLC

(57) ABSTRACT

Provided is a grill apparatus having an elongated base assembly coupled to a firebox assembly. The base assembly includes a lid with a handle, where the lid is pivotally coupled to a base along the length of the base assembly. The base has a bottom, and a hole in a side portion that is adapted to accept an exhaust piping assembly, while the bottom of the base has a hole that substantially accommodate a fire box assembly. The firebox assembly is coupled to the base assembly and includes a firebox and at least one vent. A removable shield separates the firebox assembly from the base assembly. The shield is slightly larger than the hole in the base in at least one dimension, such that as the shield rests on the base above the hole in the base, a gap is left that allows heat and air to flow from the firebox into the base assembly.

12 Claims, 5 Drawing Sheets

BARBECUE (BAR-B-QUE) GRILL AND SMOKER

CLAIM OF PRIORITY, IDENTIFICATION OF RELATED APPLICATIONS

This Utility patent application is a Continuation of and claims priority from pending U.S. patent application Ser. No. 15/953,403 filed on Apr. 14, 2018 entitled BARBECUE (BAR-B-QUE) GRILL AND SMOKER, to common inventor Jorge Sanchez.

TECHNICAL FIELD

The invention generally relates to outdoor bar-b-que grills and smokers.

Problem Statement and History

Interpretation Considerations

This section describes technical field in detail and discusses problems encountered in the technical field. Therefore, statements in the section are not to be construed as prior art.

Discussion of History of the Problem

Although sources disagree about whether barbecue originated in the Caribbean or South America, there can be no doubt that barbecue has become a popular American food tradition. Football game tailgate parties, backyard get-togethers, and Independence Day celebrations throughout America, all bring to mind the ever-present barbecue grill and smoker. And, at these events, the Barbecue chef can be found proudly smoking, roasting, and braising meats and vegetables (also called barbecue).

Not surprisingly, fans of barbecue have put their minds to inventing barbecue grills and smokers that cook barbecue faster, free of contamination, and which produce generally higher quality barbecue to eat. For example, Edward Kingsford pioneered the modern charcoal briquette in order to provide barbecue chefs with higher quality fuel, allowing them to heat the Barbecue moore effectively. Similarly, to keep bugs and particles out of his food, George Stephen took two halves of a water navigation boy to create the first steel sphere barbecue grill—which, of course, is the type of barbecue grill most people think of when they hear the word 'barbecue.' Since then, barbecue grills and smokers have taken on Apple if eration of forms and features in order to provide barbecue chefs the ability to make the perfect Barbecue meal.

For example, gas grills were invented in the 1950s to make it easier to control the cooking of barbecue. More recently, barbecue grills and smokers have begun adopting infrared radiant burners as part of their cooking means. However, very few developments in barbecue grills and smokers have furthered the ability of Barbecue chefs to cook brisket effectively. One reason there had been few developments in this area is that a brisket is a particularly tough piece of meat. Accordingly, you can take many hours to cook a brisket. this takes barbecuing a brisket out of the hands of the vast majority of cook at home barbecue chefs.

One barbecue grill that target's the cooking of a brisket is US Patent Application Number 2011/0120442 entitled Barbeque Grill and Smoker, to Duncan. Duncan's Barbecue Grill and smoker uses propane to heat the barbecue, and provides a drawer for heating food, water, or other substances. However, neither Duncan nor any other prayer art Peach a barbecue grill and smoker that is capable of using charcoal to cook a brisket without refueling replacing the charcoal while the barbecue cooks. This forces the barbecue chef to monitor the status of both the barbecue and the charcoal in the barbecue grill and smoker. This constant monitoring by the barbecue chef to the grill and smoker, and also exposes the barbecue to repeated periods of heating and cooling, resulting in a lower quality cooked brisket.

Accordingly, what is needed is a Barbecue Grill and smoker that is adapted to cook brisket with a single load of charcoal fuel, and which reliably produces a perfectly cooked brisket before the point in time that the charcoal fuel burns out. The present invention provides such a barbecue grill and smoker.

SUMMARY OF THE INVENTION

The invention provides a novel grill apparatus. The grill apparatus has an elongated base assembly coupled to a firebox assembly. The base assembly includes a lid with a handle, where the lid is pivotally coupled to a base along the length of the base assembly. The base has a bottom, a first side portion, and a second side portion, and also has a hole that is adapted to accept an exhaust piping assembly. The bottom of the base has a hole that substantially accommodate a fire box assembly.

The firebox assembly is elongated and coupled to the base assembly, and has a length sufficient to couple the firebox assembly to the hole of the base without a gap therebetween. The firebox assembly includes a firebox which has a first side portion having a first endcap assembly, and a second side portion having a second endcap assembly, where each endcap has a vent.

A removable shield generally separates the firebox assembly from the base assembly. The shield has a length, a first side end and a second side end. The shield is slightly larger than the hole in the base in at least one dimension, such that as the shield rests on the base above the hole in the base, a gap is left that allows heat and air to flow from the firebox into the base assembly.

The invention also includes a charcoal grill basket that removably resides inside of the firebox such that when charcoal is in the charcoal grilling basket, at least one air gap remains between an interior portion of the firebox and the charcoal grilling basket.

BRIEF DESCRIPTION OF THE DRAWINGS

Various aspects of the invention and its embodiment are better understood by referring to the following detailed description. To understand the invention, the detailed description should be read in conjunction with the drawings, in which.

DESCRIPTION OF AN EXEMPLARY PREFERRED EMBODIMENT

Interpretation Considerations

Figure 1:
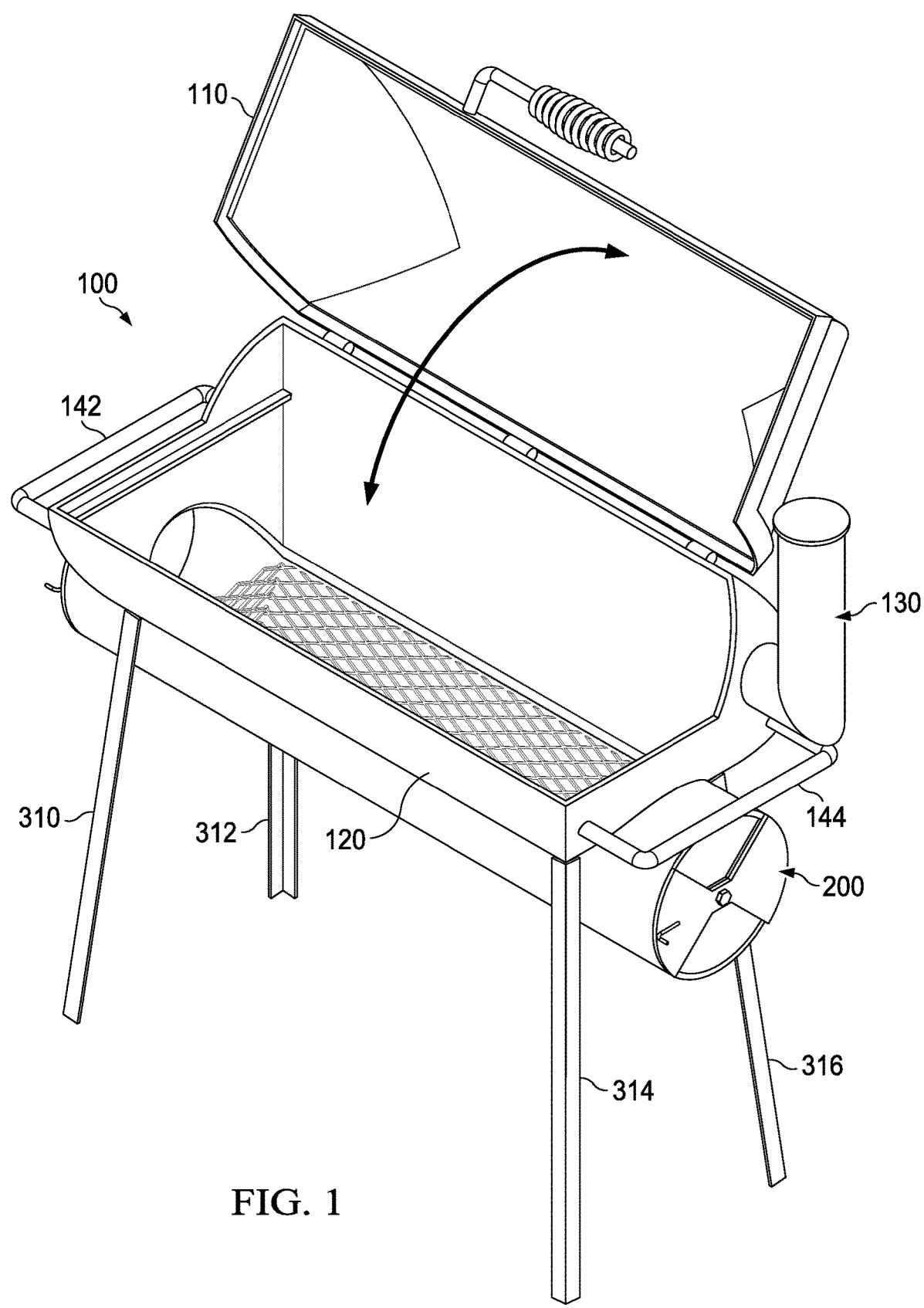
FIG. 1 illustrates an isometric view of the barbecue grill and smoker with its hood in a raised position.

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating". Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated. The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The invention provides a barbecue grill and smoker apparatus that is adapted to cook brisket with a single load of charcoal fuel, and which reliably produces a cooked brisket before the point in time that the charcoal fuel burns out. This is achieved via novel means of controlling airflow and heat-flow through the apparatus, as shown and described. Of course, although the invention is directed to a brisket, the apparatus has applicability in cooking any item, and particularly for "big hunks of protein" such as a brisket, pork shoulder, rack of ribs, leg of lamb, and the like, as well as vegetables and other items such as skewers, shish-ka-bobs, foiled or directly placed corn-on-the-cob, for example. Further, other cooking utensiles, such as deutch-ovens and the like, may be placed inside the grill and smoker apparatus. The grill and smoker apparatus has a variety of other functions, as will be readily apparent to those familiar with the outdoor arts.

FIG. 1 illustrates an isometric view of the barbecue grill and smoker (the grill apparatus) 100 with its lid 110 in a raised position. The grill apparatus 100 has an elongated base assembly which comprises a base 120 and the lid 110, coupled to a firebox assembly 200. The lid of the base assembly includes a handle assembly 111 that comprises (referring also FIG. 2) a handle 112 and a handle insulation 113. Additionally, the lid 110 is pivotally coupled to the base 120 along the length of the base 120, preferably via hinges 440 (illustrated in FIG. 4). The base 120 has a bottom portion 121, a first side portion 123, and a second side portion 125, and also has a hole 127 that is adapted to accept an exhaust piping assembly 130. The bottom 121 of the base has a hole 122, such as a cut-out, that substantially accommodates the fire box assembly 200.

Also shown in FIG. 1 are a first handle 144, and a second handle 142, as well as a first leg 310, second leg 312, third leg 314, and fourth leg 316. Each leg (310-316) is coupled to the base 120 to support the grill apparatus 100 upright.

Figure 2:
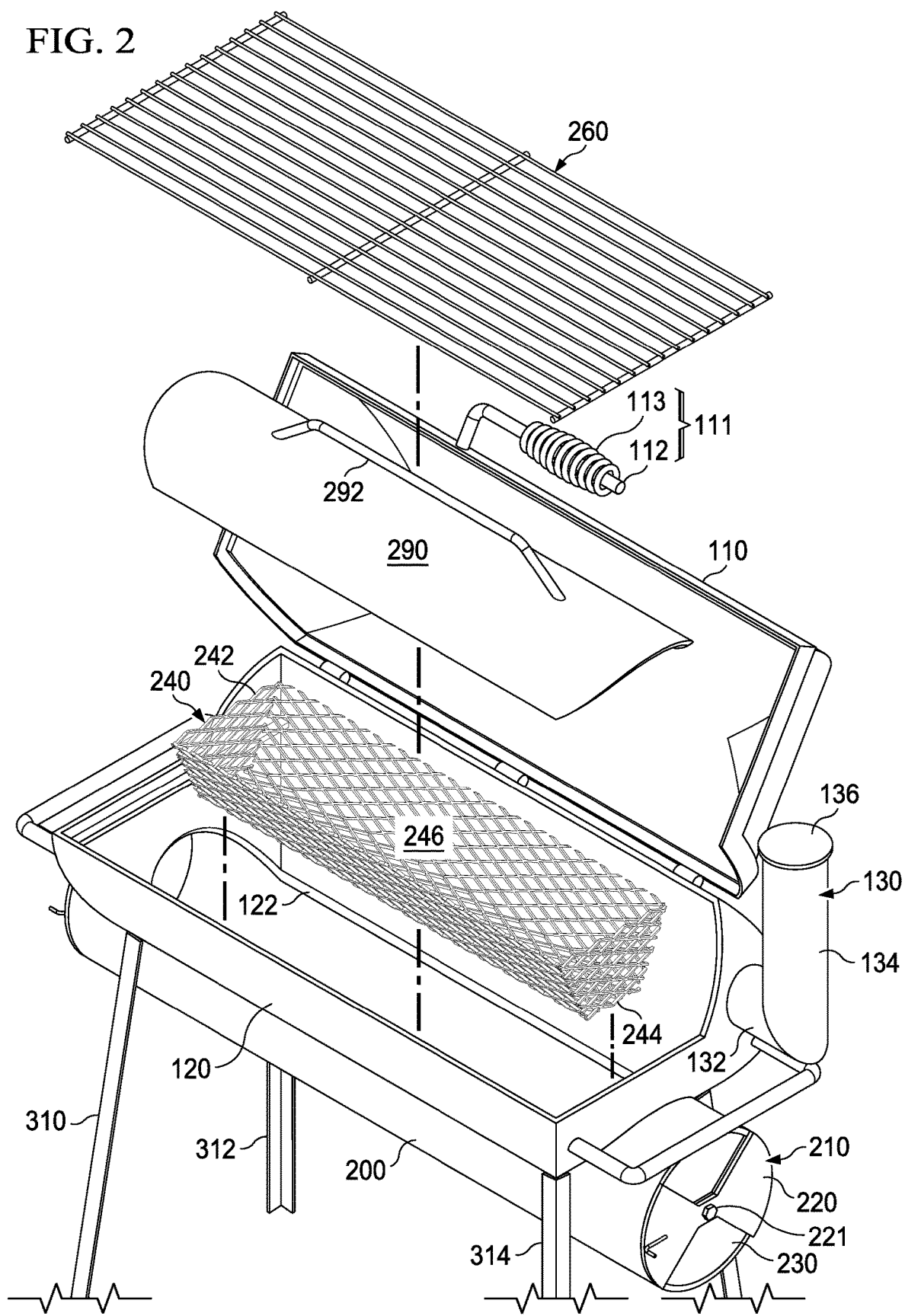
FIG. 2 illustrates a view of the barbecue grill and smoker, from the same position as shown in FIG. 1, with additional interior detail, exploded vertically.

Turning to FIG. 2, which illustrates a view of the grill apparatus 100 from the same position as in FIG. 1, exploded vertically, additional details are provided. In particular, a charcoal grilling basket 246, shield 290 and food grill 260 are shown. Food grills are well known in the grilling arts. The charcoal grilling basket 246 is used to hold charcoal during the cooking process, and is a generally elongated metal basket having a first end 244 and a second end 242.

While the charcoal grilling basket 246 may be U-shaped as shown in FIG. 2, or V-shaped, it is preferred that the charcoal grilling basket 246 by shaped to have a cross-section resembling the base and two legs of a trapezoid, such that while cooking the base of the charcoal grilling basket 246 rests in the firebox assembly 200. Further, preferably, the charcoal grill basket 246 removably resides inside of the firebox assembly 200 such that when charcoal is in the charcoal grilling basket 246, at least one air gap remains between an interior portion of the firebox assembly 200 and the grilling basket 246 (shown in FIG. 4).

Also shown in FIG. 2 is the removable heat shield (or, simply "shield") 290. The heat shield 290 generally separates the firebox assembly 200 from the base assembly. The heat shield 290 has a length, L, a width, W, a first side end 291, and a second side end 293. The heat shield 290 is slightly larger than the hole 122 in the base 120 in at least one dimension (either the length and/or the width), such that as the heat shield 290 rests on the base 120 above the hole 122 in the base, a first gap 422 and a second gap 424 (see FIG. 4) are created and allow heat and air to flow from the firebox assembly 200 into the base assembly. The shield further includes a handle 292 coupled to a top portion of the shield 290 in order to make placing the heat shield 290 into, and pulling the heat shield 290 out of, the base assembly. Functionally, the heat shield 290 provides protection from the direct heat generated by charcoal in the firebox. The heat shield 290 disperses heat-flow away from direct contact with the item(s) being cooked, and directs it instead throughput the grill apparatus 100 allowing the item being cooked to be cooked evenly.

FIG. 2 additionally shows the exhaust piping assembly 130. The exhaust piping assembly 130 includes an exhaust shoulder 132, an exhaust arm 134 having a length, X (illustrated in FIG. 5), and an exhaust closure 136 pivotally-coupled to the end of the exhaust arm 134 preferably by a pin (not shown) as is known in the mechanical arts. In some embodiments, the exhaust shoulder 132 protrudes into the base assembly to define an interior exhaust piping 131 (see FIG. 3) such that the length of interior piping is adjustable by a user positioning or moving the exhaust shoulder into (and/or out of) the base assembly. Further, in some embodiments the exhaust arm length, X, is adjustable via fluting, slide valve(s), or equivalent structures.

Figure 3:
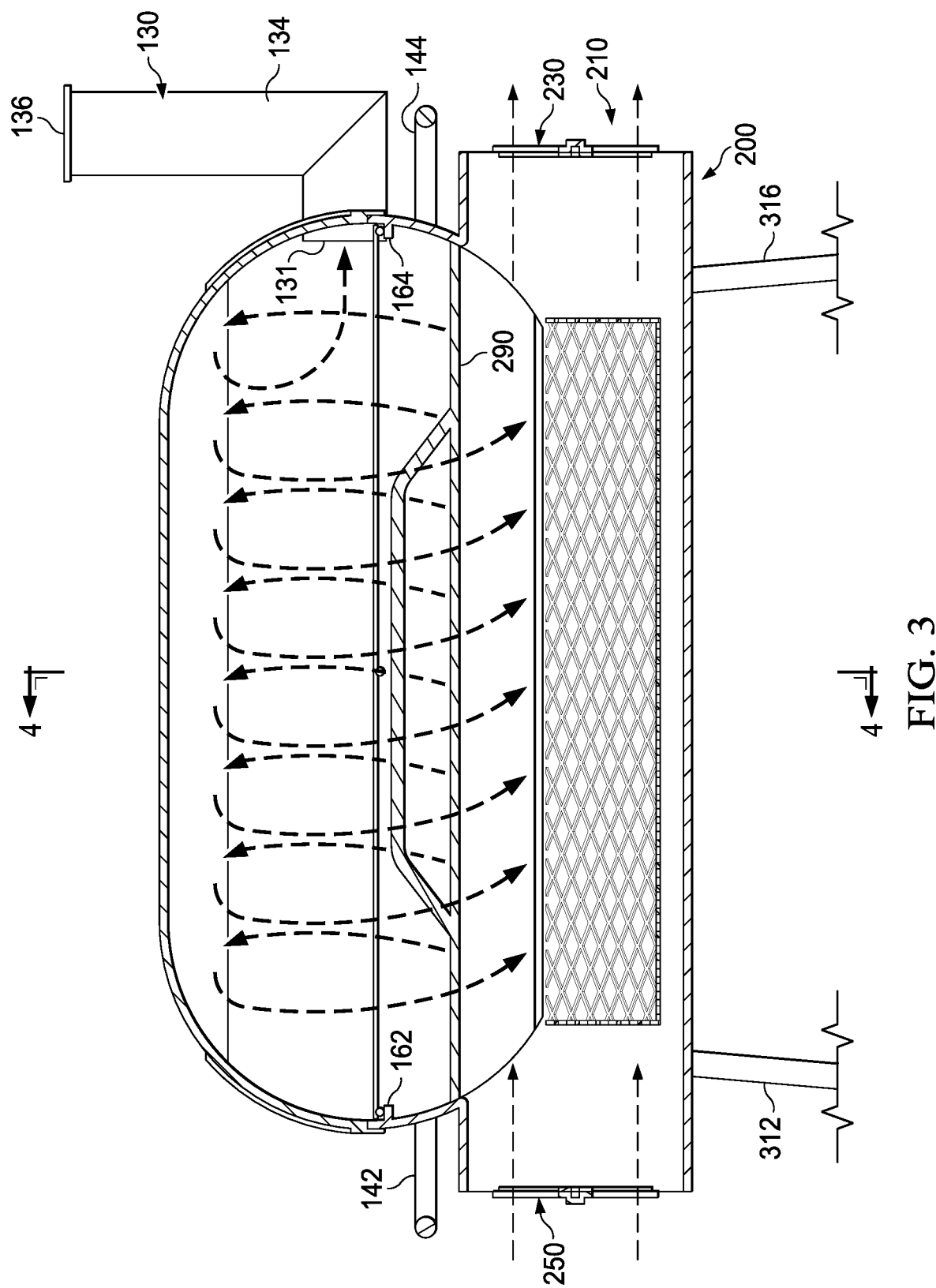
FIG. 3 is a cut-view of the barbecue grill and smoker, as viewed along the cut-lines of FIG. 4.
Figure 4:
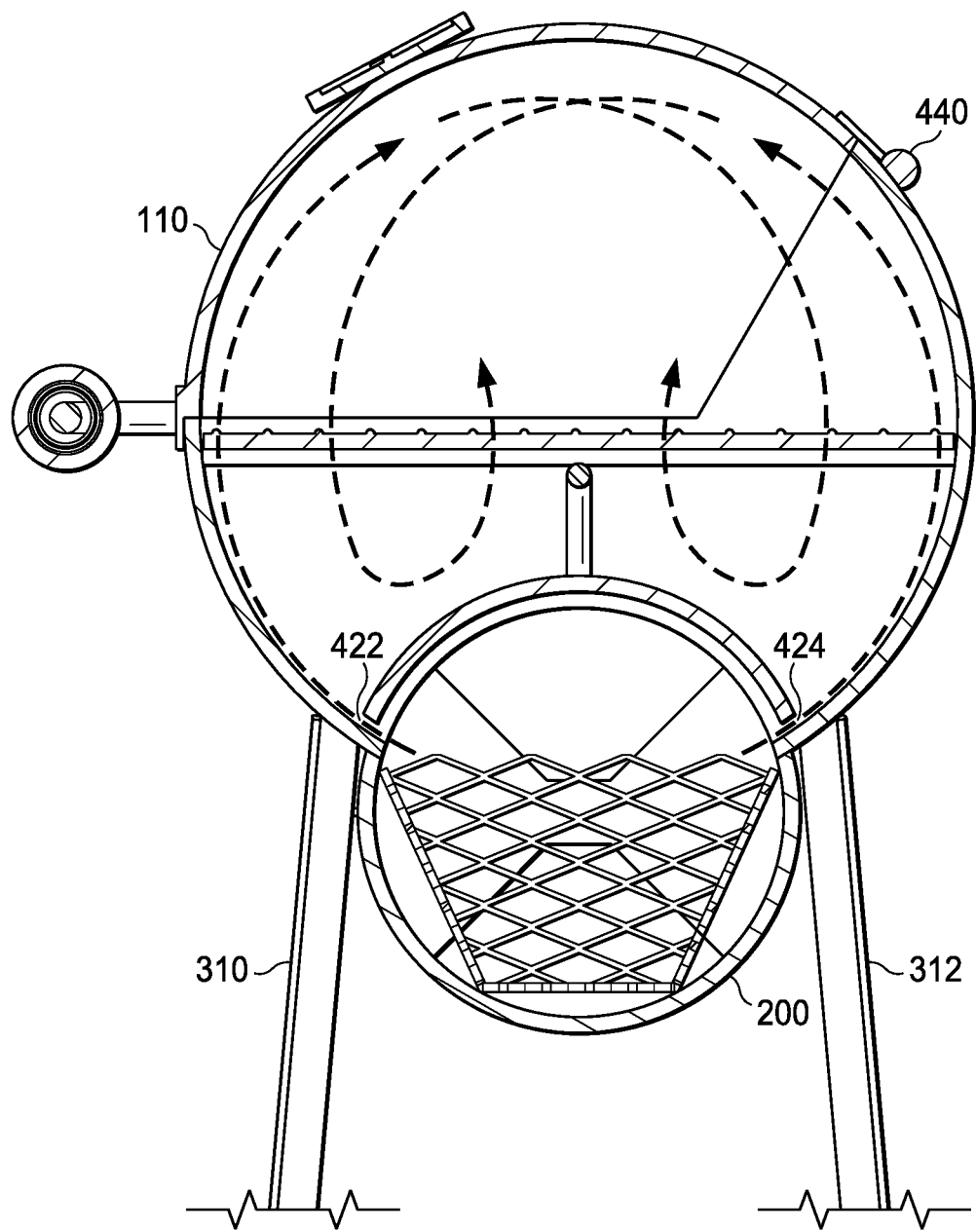
FIG. 4 is a cut-view of the barbecue grill and smoker as viewed through the cut-lines of FIG. 3, and more clearly shows gaps that allow heat and air into the cooking area of the barbecue grill and smoker.

Turn now to the firebox assembly 200 of FIG. 2, which is described with simultaneous reference to FIG. 3 which is a cut-view of the grill apparatus 100 as viewed along the cut lines of FIG. 4. The firebox assembly 200 is elongated and coupled to the base 120, and has a length sufficient to couple the firebox assembly 200 to the hole 122 of the base without a gap there-between. The firebox assembly 200 includes a firebox 205 (comprising the walls of the firebox assembly itself), a first side portion having a first endcap assembly 210, and a second side portion having a second endcap assembly 250 (see FIG. 3).

The first endcap assembly 210 comprises a cap 225 (see FIG. 3) having at least one hole defining a vent 230, and a rotatable pinwheel 220 coupled to the cap 225, the pinwheel 220 is shaped to completely seal the vent 230 when in a first position, and to uncover the vent when in a second position. Correspondingly, the second endcap assembly 250 comprises a cap 255 (see FIG. 3) having at least one hole defining a vent (not shown), and a rotatable pinwheel 220 coupled to the cap 225, the pinwheel 270 which is shaped to completely seal the vent when in a first position, and to uncover the vent when in a second position.

While a cylindrical firebox 205 is shown in FIG. 2, the firebox 205 may have any three-dimensional shape so long as it is able to be adapted to hold or support the charcoal grilling basket 246 and couple to the base 120 without a gap therebetween.

FIG. 3 also illustrates additional details of the interior of the grill assembly. Specifically, it is seen that a first grill stop 164 proximate to the first end of the base 120, and second grill stop 162 proximate to the second end of the base 120, are provided so that the food grill 260 may rest there upon in the base 120, above the firebox (and the hot charcoal it contains while cooking), and the shield 290. As is well-known in the art (and throughout America), food is grilled, cooked, braised, or smoked upon the food grill 260.

The horizontal dashed lines with arrows in FIG. 3 illustrate the flow of oxygen-rich ambient air into the firebox assembly 200 through the second endcap assembly 250, and oxygen-depleted hot air out of the firebox assembly 200 via the first endcap assembly 210. Additionally, the 'circulating' dashed lines with arrows illustrate that hot air from the firebox circulates through the (closed) base assembly, and leaves the base assembly via the exhaust piping assembly 130. Also more clearly seen in FIG. 3 are the first handle 144 which is coupled to the first end of the base 120, and the second handle 142 which is coupled to the second end of the base 120.

The circulation of hot air is additionally illustrated in FIG. 4, which is a cut-view of the grill apparatus 100 as viewed through the cut lines of FIG. 3, and more clearly shows the first gap 422 and second gap 424 that allow heat and air into the cooking area of the grill assembly. In FIG. 4, the hinge 440 referenced above, is more clearly seen as well as the plate-portion of the hinge 440 which is coupled to the lid 110. Additionally, a monitor 410, which includes a thermometer, provides a user the ability to know temperature and other factors that influence the quality of the barbecue being prepared—particularly a brisket.

Figure 5:
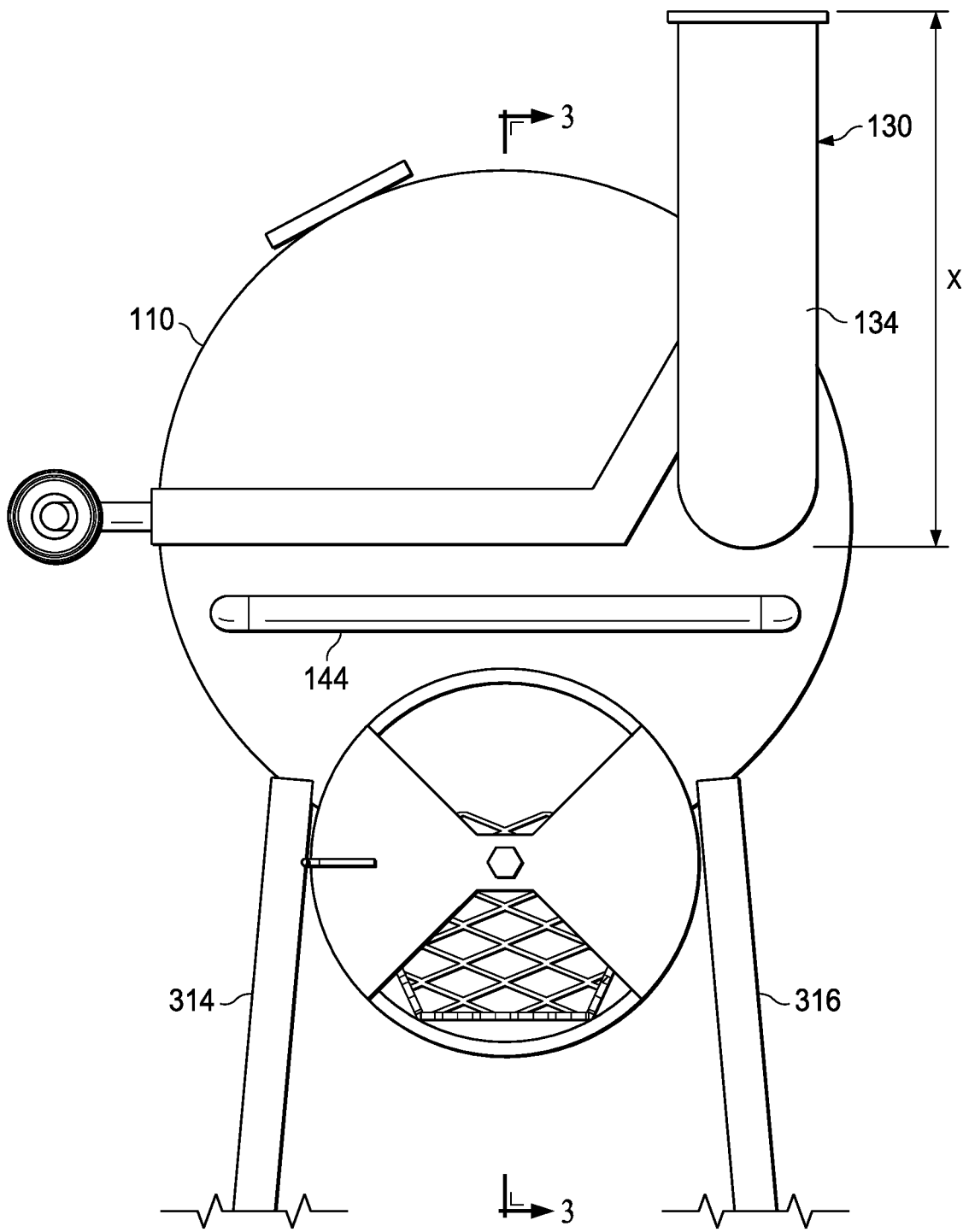
FIG. 5 illustrates a side view of the barbecue grill and smoker.

FIG. 5 illustrates a side-on view of the grill apparatus 100. From FIG. 5 and in reference again to FIG. 2, one may see the endcap assembly 210 rotated in the first (open) position, which provides for airflow through the open vent 130. In addition, the adjustable height, X, of the exhaust arm 134 is illustrated.

Accordingly, oxygen-rich air flows into one vent of an endcap assembly and into the elongated fire box assembly 200. The air flows about the the charcoal basket, especially in-between the charcoal basket which holds the charcoal (fuel) and the interior of the firebox which is physically separated from the charcoal by the charcoal basket by a width with optimizes air-flow the particular item being cooked. Accordingly, it is anticipated that charcoal baskets of varying designs and shapes will be provided to control the air-flow as appropriate for the items being cooked and the desired cook time. The second vent at the other endcap assembly allows oxygen-depleted air to flow out of the firebox assembly 200. Accordingly, the charcoal basket, as well as the size of the opening of the vents, provide a user the ability to control fuel to oxygen ratios. This provides heat-source stability while cooking.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

I claim:

1. A grill apparatus, comprising:
an elongated base assembly, the elongated base assembly having a length, a width, and a depth, the elongated base assembly comprising:
a lid comprising a handle pivotally coupled to a base along the length of the elongated base assembly,
the base having a bottom, a first side portion, and a second side portion, and further having a hole that is adapted to accept an exhaust piping assembly;
the bottom of the base having a hole that substantially accommodate an elongated fire-box assembly,
the elongated firebox assembly coupled to the elongated base assembly, the elongated firebox assembly having a length sufficient to couple the elongated firebox assembly to the hole of the base without a gap there-between, wherein the elongated firebox assembly is coupled with the base and the lid and the elongated firebox assembly comprises:
a firebox having a first side portion and a second side portion, and
a first endcap assembly coupled to the first side portion, and a second endcap assembly coupled to the second side portion, wherein the firebox supports a charcoal grilling basket and coupled to the base without a gap therebetween, wherein an oxygen-rich ambient air is passed into the elongated firebox assembly through the second endcap assembly, and an oxygen-depleted hot air is passed out of the elongated firebox assembly via the first endcap assembly, wherein the oxygen-depleted hot air from the firebox circulates through the elongated base assembly, and leaves the elongated base assembly via the exhaust piping assembly;

a removable shield having a length dimension and a width dimension, a first side end and a second side end;

the removable shield for resting between the elongated base assembly and the elongated firebox assembly, the removable shield being slightly larger than the hole in the base in at least one dimension, and shaped such that as the removable shield rests on the base above the hole in the base a gap is left such that heat and air flow from the firebox into the elongated base assembly; and the charcoal grilling basket that removably resides inside of the firebox such that when charcoal is in the charcoal grilling basket, at least one air gap remains between an interior of the firebox and the charcoal grilling basket.

2. The grill apparatus of claim 1 wherein the elongated base assembly further comprises at least one handle coupled thereto.

3. The grill apparatus of claim 1 wherein the lid further comprises at least one handle coupled thereto.

4. The grill apparatus of claim 3 wherein the at least one handle is a heat-insulated handle.

5. The grill apparatus of claim 1 wherein the exhaust piping assembly comprises an exhaust shoulder, an exhaust arm having a length, and an exhaust closure coupled to an end of the exhaust arm.

6. The grill apparatus of claim 5 wherein the length of the exhaust arm is adjustable.

7. The grill apparatus of claim 1 wherein the charcoal grilling basket is V-shaped.

8. The grill apparatus of claim 1 wherein the charcoal grilling basket is U-shaped.

9. The grill apparatus of claim 1 wherein the charcoal grilling basket has a cross-section shaped like the base and two legs of a trapezoid.

10. The grill apparatus of claim 1 wherein the base of the charcoal grilling basket rests in the firebox.

11. The grill apparatus of claim 1 wherein the width dimension of the lid is wider than a width dimension of the hole in the base.

12. The grill apparatus of claim 1 wherein the length dimension of the lid is longer than a length dimension of the hole in the base.

* * * * *